United States Patent [19]

Hettinga

[11] Patent Number: 5,275,764

[45] Date of Patent: Jan. 4, 1994

[54] METHOD OF MOLDING A VEHICLE LAMP ASSEMBLY

[76] Inventor: Siebolt Hettinga, 2123 NW. 111th St., Des Moines, Iowa 50322

[21] Appl. No.: 664,224

[22] Filed: Mar. 4, 1991

[51] Int. Cl.$^5$ .............. B29D 11/00; F21V 7/09
[52] U.S. Cl. .................. 264/1.9; 264/1.7; 264/247; 264/252; 362/61; 362/83.1; 362/331
[58] Field of Search .......... 264/1.9, 247, 252, 255, 264/1.7; 362/61, 83.1, 331

[56] References Cited

U.S. PATENT DOCUMENTS

| | | | |
|---|---|---|---|
| 3,402,004 | 9/1968 | Warkel | 264/1.9 |
| 4,800,468 | 1/1989 | Yokoyama | 362/61 |
| 5,001,610 | 3/1991 | Otaka | 362/61 |

FOREIGN PATENT DOCUMENTS

| | | | |
|---|---|---|---|
| 2607231 | 9/1976 | Fed. Rep. of Germany | 264/247 |
| 675147 | 7/1952 | United Kingdom | 264/252 |

*Primary Examiner*—James Lowe
*Attorney, Agent, or Firm*—Brian J. Laurenzo; Kent A. Herink; Brett J. Trout

[57] ABSTRACT

An improved lamp assembly for a motor vehicle and a method for molding same is provided in which a one-piece lamp having one or more colors or reflective means integrated in a single lens panel and frame is molded in a single plastic injection process. In the process, one or more colored or reflective elements are placed between two mold segments, the mold segments are closed, and a plastic is injected into the mold cavity in bonding securement of the colored or reflective elements.

10 Claims, 3 Drawing Sheets

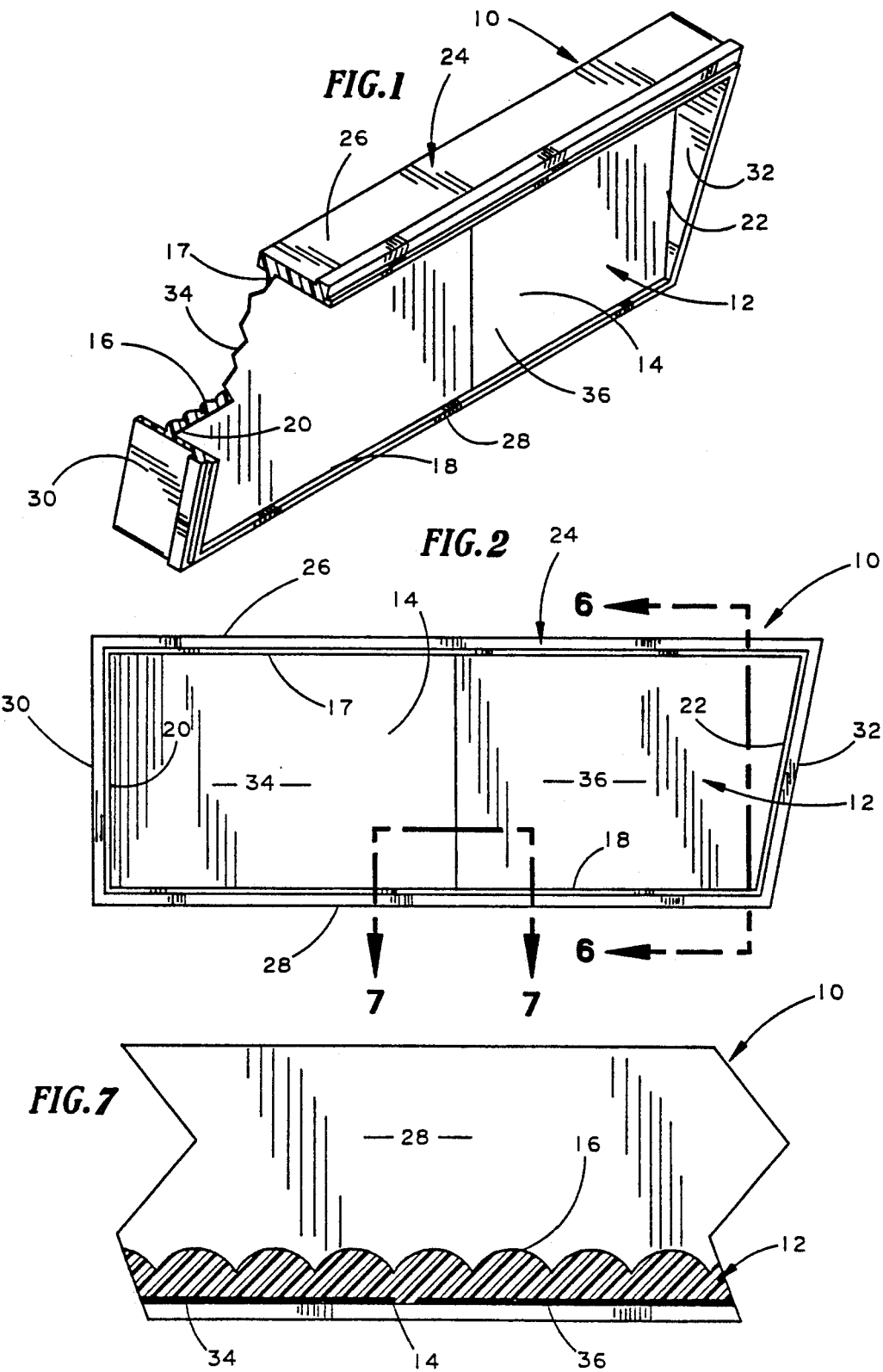

METHOD OF MOLDING A VEHICLE LAMP ASSEMBLY

BACKGROUND OF THE INVENTION

The present invention relates generally to the manufacture of a plastic article and, more particularly, to a lamp assembly and a method for molding same in which one or more colored or reflective elements are integrated in a total bonded relationship with a unitary transparent plastic lens panel and frame.

In the past, in the manufacture of lamp assemblies for motor vehicles, multiple colors and reflective areas in a lamp assembly were achieved by separately molded lens panels of one color or reflective material which were then combined with one another in a separate frame and secured to the motor vehicle. In the case of tail lamp assemblies, the lens panels most often had corrugated rear faces and flat front faces. The corrugated rear face distributes the light across the panel. However, in a colored lens panel, light is transmitted through a corrugated layer of color which has a non-uniform thickness and optical density. Accordingly, when viewed from the rear of the vehicle, the lens panel has a plurality of low intensity and high intensity color bands. Furthermore, the numerous colored lens panels and frame in a single tail lamp assembly, as well as the lamp assemblies on a vehicle dash board, interior side of a vehicle door, or other similar applications such as the warning lights on an industrial machine are more costly to produce and take more time to assemble than a lamp assembly manufactured in a single mold.

These difficulties in prior art lamp assemblies are substantially eliminated by the present invention.

SUMMARY OF THE INVENTION

Accordingly, it is an object of the present invention to provide a method for molding a one-piece lamp assembly which has one or more optically distinguishable elements integrated in a bonded relationship within a unitary lens panel and frame.

It is another object of the present invention to provide an improved lamp assembly comprising a single lens panel having one or more optically distinguishable elements integrated therein.

By the present invention, it is proposed to overcome the difficulties encountered heretofore. To this end, it has been discovered that placing one or more colored or reflective elements into a mold cavity and injecting a plastic material into the mold cavity and about the colored or reflective elements provides a one-piece lamp assembly having one or more colors or reflective means in a single lens panel. The elements are of uniform thickness and density thus providing a more even distribution of color when lit. Furthermore, the one-piece lamp reduces cost and time of manufacturing when compared to the lamp assemblies of the prior art.

BRIEF DESCRIPTION OF THE DRAWINGS

In the drawings:

FIG. 1 is a perspective view of a tail lamp for a motor vehicle made in accordance with the method of this invention;

FIG. 2 is a front elevation of the tail lamp shown in FIG. 1;

FIG. 7 is a sectional plan view of the tail lamp taken along lines 7—7 of FIG. 2.

DETAILED DESCRIPTION OF THE INVENTION

Figure 3:
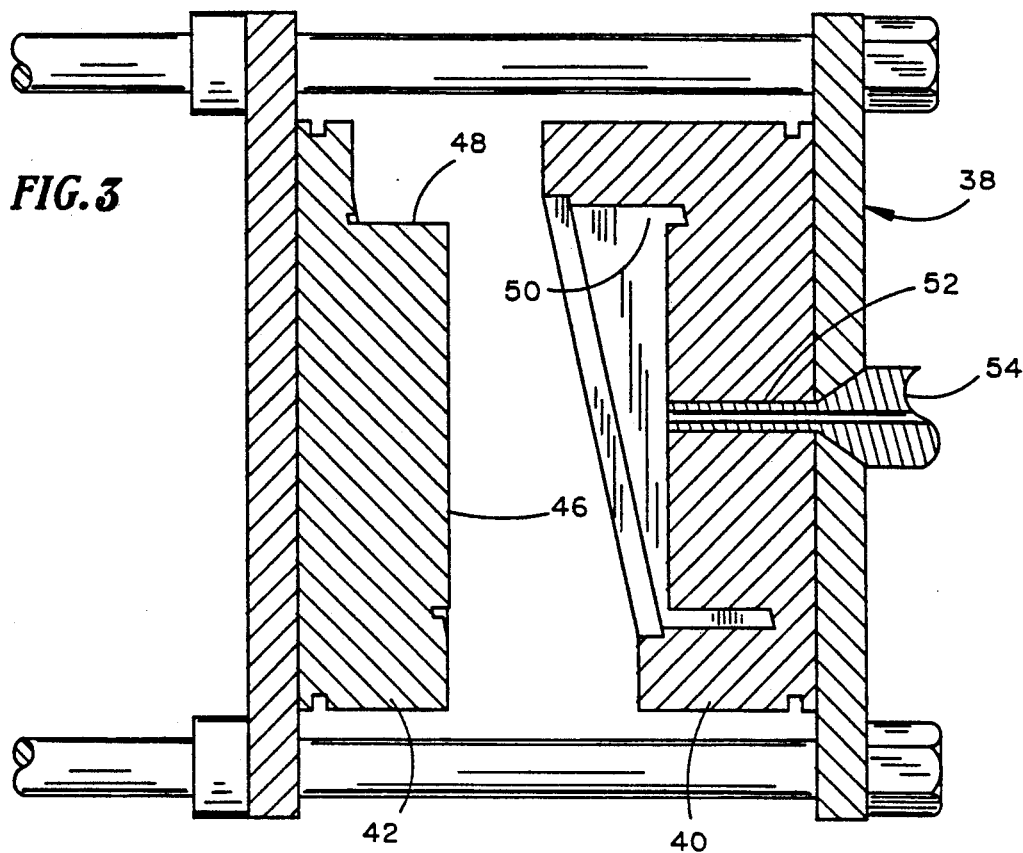
FIG. 3 is a sectional elevation of a mold unit for forming the tail lamp shown in FIG. 1, with the mold unit shown in the open position therefor.

In FIGS. 1, 2, 6 and 7, a tail lamp 10 for use in a motor vehicle and embodying the improved design of the present invention is shown wherein a pair of thin, flat optical elements 34 and 36 are molded in a single step to be integral with the tail lamp 10. The tail lamp 10 is comprised of a transparent plastic and includes a generally planar, generally vertical lens panel 12 which has a front flat face 14 and a rear corrugated face 16 (FIG. 7). The lens panel 12 further includes a top edge 17, a bottom edge 18 and side edges 20 and 22 (FIG. 2). An integrated frame 24 borders the lens panel 12 and includes a top member 26, a bottom member 28 and side members 30 and 32 (FIG. 1) which correspond to lens panel edges 17, 18, 20 and 22 respectively.

The optical elements 34 and 36 are visually distinguishable from the transparent plastic lens panel 12 and frame 24 and are of uniform thickness and density. The optical elements 34 and 36 may be comprised of a transparent, colored acrylic film or of a reflective nature (e.g., thin aluminized polyester such as MYLAR). When molded into the tail lamp 10, the optical elements 34 and 36 are substantially parallel with and located proximate the front face 14 of the lens panel 12 (FIG. 7).

Figure 4:
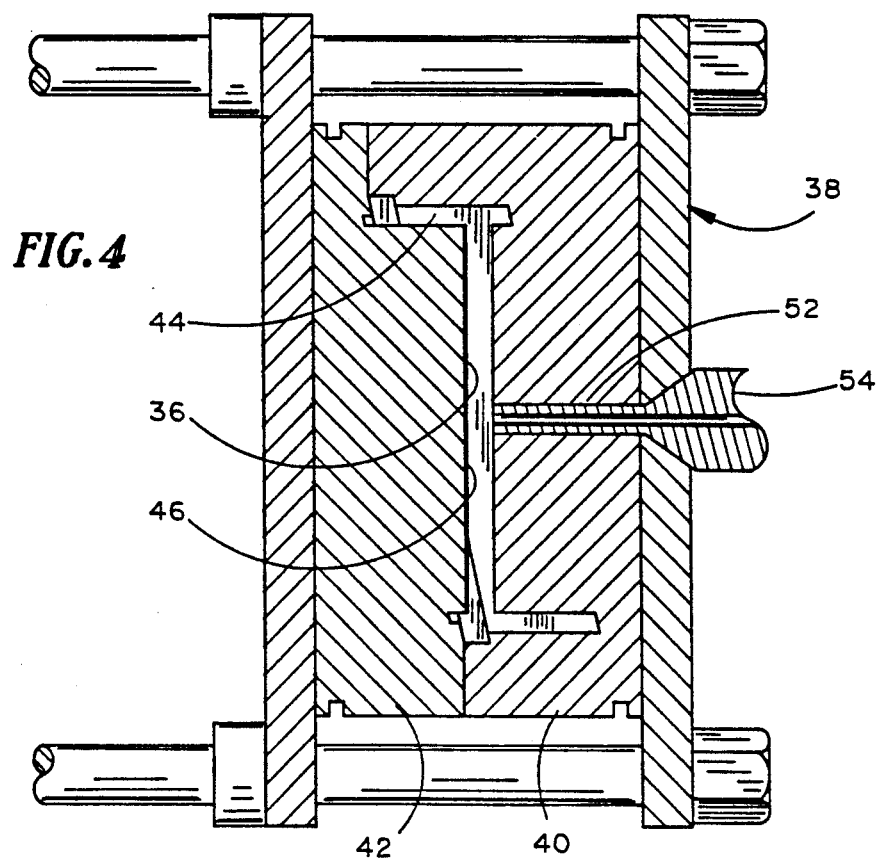
FIG. 4 is illustrated similarly to FIG. 3 and shows the mold unit in a closed position therefor.
Figure 5:
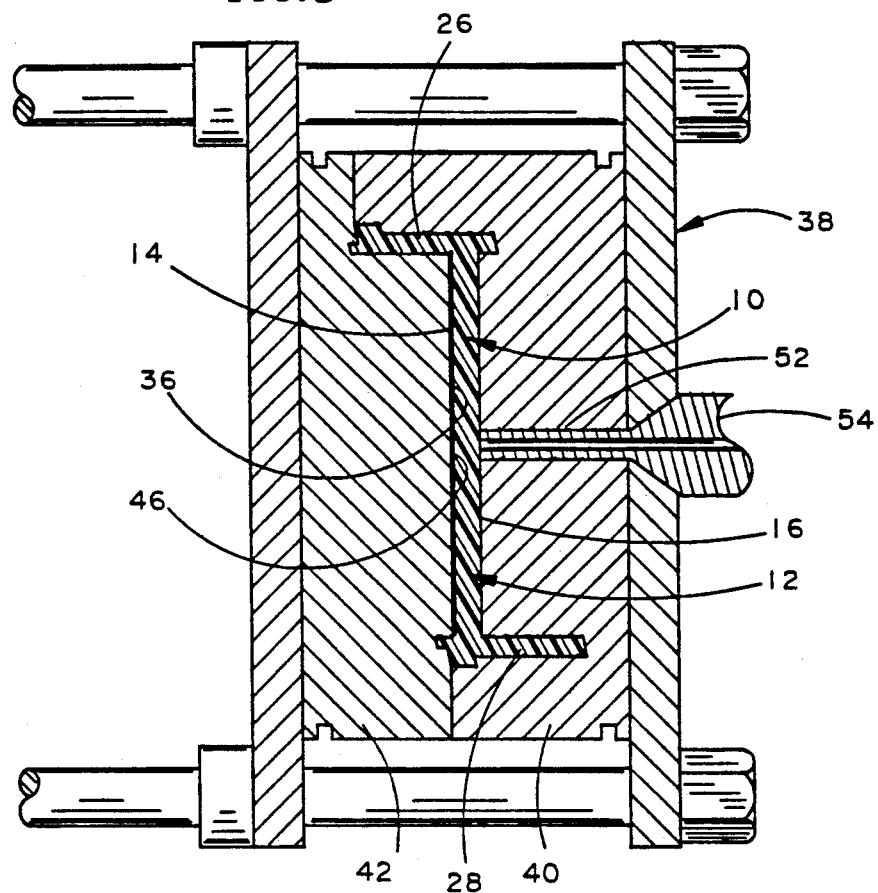
FIG. 5 shows the closed mold unit shown in FIG. 4 after a plastic has been injected into the closed mold.
Figure 6:
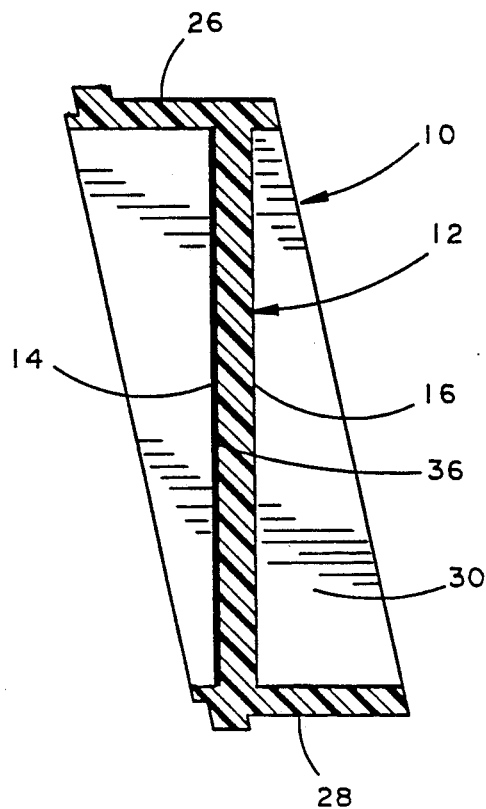
FIG. 6 is a sectional side elevation view of the tail lamp taken along lines 6—6 of FIG. 2.

In the molding of the improved tail lamp 10, there is provided a plastic injection mold unit (shown at 38 in FIGS. 3-5) having a stationary male mold portion 40 and a movable female mold portion 42 which, when the mold unit 38 is in its closed position (FIGS. 4 and 5), form a mold cavity 44 for the tail lamp 10. The mold portions 40 and 42 are shown in their open positions in FIG. 3. Before the mold unit 38 is closed, the optical elements 34 and 36, shown exaggerated for clarity, are placed adjacent to one another proximate a flat surface 46 of the female mold portion 42. A second embodiment is contemplated in which the optical elements 34 and 36 are spaced from one another. No location means, such as fasteners or holders, are required to position the optical elements 34 and 36 proximate the flat surface 46 of the female mold portion 42, although a vacuum or mechanical means could be incorporated to achieve this purpose.

The female mold portion 42 is moved toward the male mold portion 40 and clamped into a closed position wherein a projecting member 48 of the male mold portion 40 is received within a coacting recess 50 formed in the female mold portion 42 thereby creating the mold cavity 44. A plastic material is then injected into the mold cavity 44 through a gate opening 52 from an injection nozzle 54 to fill the mold cavity 44 and about the optical elements 34 and 36 to thereby securely bond the optical elements 34 and 36 within the injected plastic. The female mold portion 42 is then moved away from the male mold portion 40 and the resultant tail lamp 10, having colored or reflective elements 34 and 36 integrated in a total bonded relationship therewith, is removed.

The tail lamp 10 comprised of the lens panel 12, the frame 24 and the optical elements 34 and 36 thus constitutes an integral one-piece unit which can be used alone as one of the tail lamps in a motor vehicle.

As described hereinabove, in one application, the optical elements 34 and 36 are of uniform thickness and color density. Accordingly, light transmitted through the lens panel 12, when viewed through the optical elements 34 and 36 that are located proximate the front flat face 14 of the lens panel 12, will have a more uniform color than tail lamps known in the prior art. In a second application, wherein either or both of the optical elements 34 and 36 are reflective, the corrugated rear face 16 does not affect the uniform appearance through the flat face 14 of the lens panel 12.

During the injection of the plastic material into the mold cavity 44, it is preferred that the melt temperature and the system pressure be such that a uniform viscosity be maintained throughout the injected plastic.

While polycarbonate is preferred as the transparent plastic material of the tail lamp 10, other materials may be used which are transparent and suitable for indoor and outdoor use. Likewise, while colored or reflective acrylic film is preferred for the optical elements 34 and 36 in the tail lamp 10, other similar materials may be used.

In addition, while a tail lamp assembly is shown in the drawings and described herein, it is to be understood that this invention is equally applicable to other lamp assemblies such as those used in the dashboard or interior side of a door of a motor vehicle, as well as to warning lights on industrial machines, among others.

Furthermore, several optical elements could be placed on top of one another within the mold cavity, the top optical element further including a shaped cutout portion thereby revealing the color of the underlying optical element to provide one or more colored shapes in a single lamp assembly. This would be especially applicable for use in a dashboard of a motor vehicle for bright light symbols and other indicators such as warning lights, among others.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, while the lens panel 12 and frame 24 appear to be trapezoidal in shape when viewed from the front or the rear, it is contemplated that other shapes may be used. By further example, while only two optical elements 34 and 36 have been described, a single element may be used and any number of elements greater than two are also contemplated.

I claim:

1. A process of injection molding for forming a lamp assembly wherein light passing through said lamp assembly is more uniform in color, said lamp assembly having at least one corrugated surface and at least one substantially flat surface, said lamp assembly having one or more colors, said process comprising:
    (a) providing a male mold portion and a female mold portion one of said male mold portion and said female mold portion for forming said substantially flat surface of said lamp assembly and the other of said male mold portion and said female mold portion for forming said corrugated surface of said lamp assembly;
    (b) providing one or more optically distinguishable thin sheet of film, each said optically distinguishable thin sheet of film being a different color;
    (c) placing said optically distinguishable thin sheet of film between said male mold portion and said female mold portion adjacent said one of said male mold portion and sad female mold portion forming said substantially flat surface of said lamp assembly;
    (d) clamping said male mold portion and said female mold portion together to form an injection mold cavity for said lamp assembly;
    (e) injecting a plastic material into the mold cavity and about said optically distinguishable thin sheet of film; and then
    (f) removing the resultant lamp assembly from the mold cavity.

2. The process, according to claim 1, wherein two or more optically distinguishable thin sheets of film are placed adjacent to one another between said male mold portion and said female mold portion.

3. The process, according to claim 1, wherein two or more optically distinguishable thin sheets of film are spaced from one another between said male mold portion and said female mold portion.

4. The process, according to claim 1, wherein said optically distinguishable thin sheet of film is comprised of a substantially transparent, colored acrylic.

5. The process, according to claim 1, wherein one of said optically distinguishable thin sheets of film is comprised of a reflective material.

6. A process of injecting molding for forming a lamp assembly having one or more colors for use in a motor vehicle wherein light passing through said lamp assembly is more uniform in color, said lamp assembly having at least one corrugated surface and at least one substantially flat surface, said process comprising:
    (a) providing an injection mold having a female member and a male member, one of said female member and said male member for forming said substantially flat surface of said lamp assembly and the other of said female member and said male member for forming said corrugated surface of said lamp assembly;
    (b) providing one or more optically distinguishable thin sheet of film, each said optically distinguishable thin sheet of film being a different color;
    (c) placing said optically distinguishable thin sheet of film between said male member and said female member and proximate said one of said male member and said female member forming said substantially flat surface of said lamp assembly;
    (d) clamping said female member and said male member of said injection mold together to form a plastic receiving chamber means;
    (e) injecting a plastic within said chamber means in bonding securement of said optically distinguishable thin sheet of film; and then
    (f) removing the resultant lamp assembly from said injection mold.

7. The process, according to claim 6, wherein two or more optically, distinguishable thin sheets of film are placed adjacent to one another between said male member and said female member and proximate said female member of said injection mold.

8. The process, according to claim 6, wherein two or more optically distinguishable thin sheets of film are placed spaced from one another between said male member and said female member nd proximate said female member of said injection mold.

9. The process, according to claim 6, wherein said optically distinguishable thin sheet of film is comprised of a substantially transparent, colored acrylic.

10. The process, according to claim 6, wherein one of said optically distinguishable thin sheets of film is comprised of a reflective material.

* * * * *